United States Patent [19]

Johannesen

[11] 4,142,611

[45] Mar. 6, 1979

[54] DISC BRAKE WITH MECHANICAL ACTUATOR

[75] Inventor: Donald D. Johannesen, South Bend, Ind.

[73] Assignee: The Bendix Corporation, Southfield, Mich.

[21] Appl. No.: 828,807

[22] Filed: Aug. 29, 1977

[51] Int. Cl.² ............................................. F16D 65/16
[52] U.S. Cl. ................................... 188/72.9; 188/73.4
[58] Field of Search .................... 188/72.6, 72.9, 73.4, 188/106 F

[56] References Cited

U.S. PATENT DOCUMENTS

| | | | |
|---|---|---|---|
| 1,978,974 | 10/1934 | Williams | 188/72.9 X |
| 3,095,949 | 7/1963 | Butler | 188/73.4 X |
| 3,424,278 | 1/1969 | Ostwald et al. | 188/72.6 |
| 3,590,961 | 7/1971 | Airheart | 188/73.4 |
| 3,599,758 | 8/1971 | Bishop | 188/73.4 |
| 3,613,837 | 10/1971 | Tsubouchi | 188/72.9 |
| 3,913,709 | 10/1975 | Burgdorf et al. | 188/73.4 |

*Primary Examiner*—George E. A. Halvosa
*Attorney, Agent, or Firm*—Paul David Schoenle; Ken C. Decker

[57] ABSTRACT

The present invention relates to a mechanical disc brake wherein a pair of friction elements are urged into engagement with a rotor to effectuate braking of the rotor. A frame slidably engaging a support carries the pair of friction elements and a second lever and a link connects with the frame and a first lever. The first lever is movable to impart rotation to the second lever which urges one of the pair of friction elements into engagement with the rotor. At the same time, the link is movable by the first lever so that the link and second lever cooperate to slide the frame relative to the support thereby urging the other of the pair of friction elements into engagement with the rotor. A plate releasably carried by the first lever opposes the link to connect the first lever with the link.

1 Claim, 6 Drawing Figures

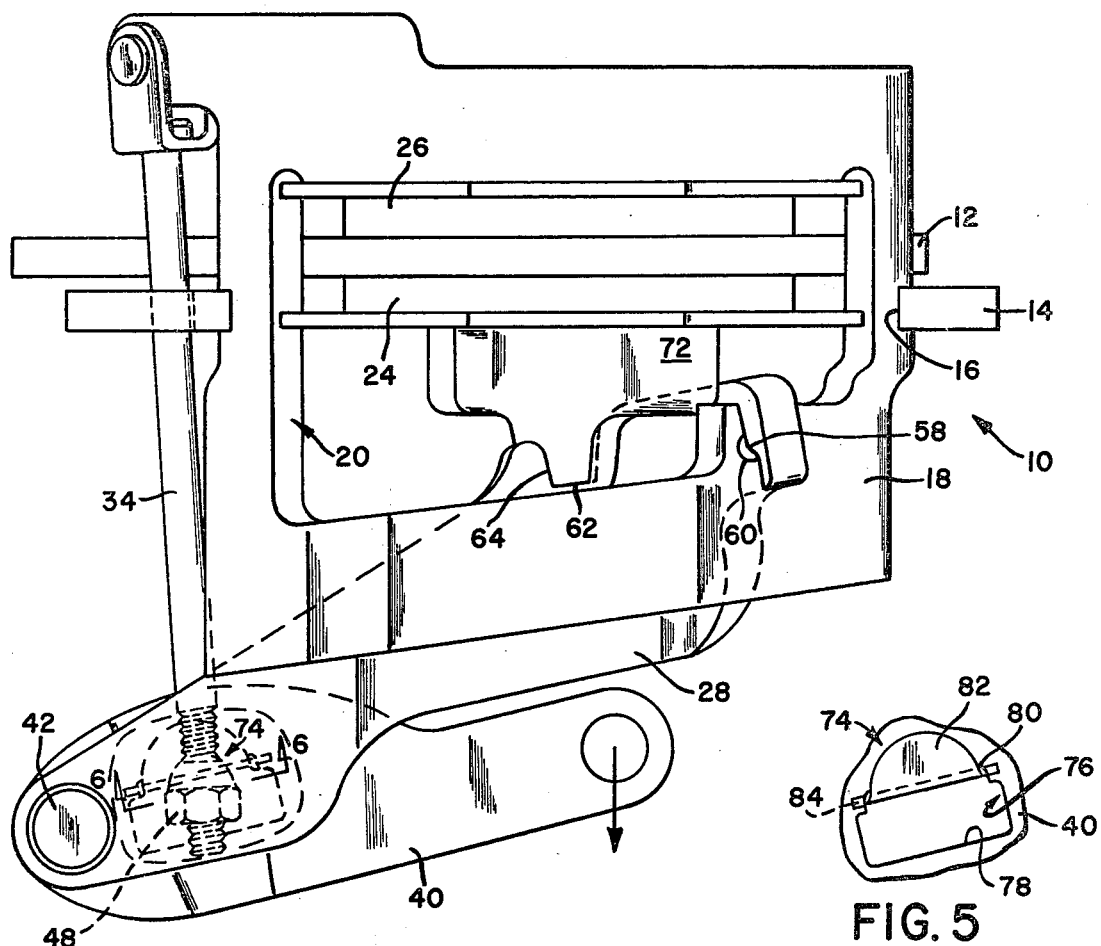
FIG. 3
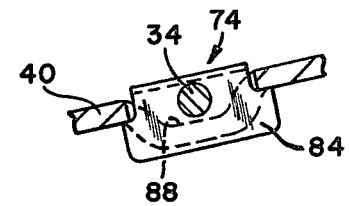
FIG. 5
FIG. 6
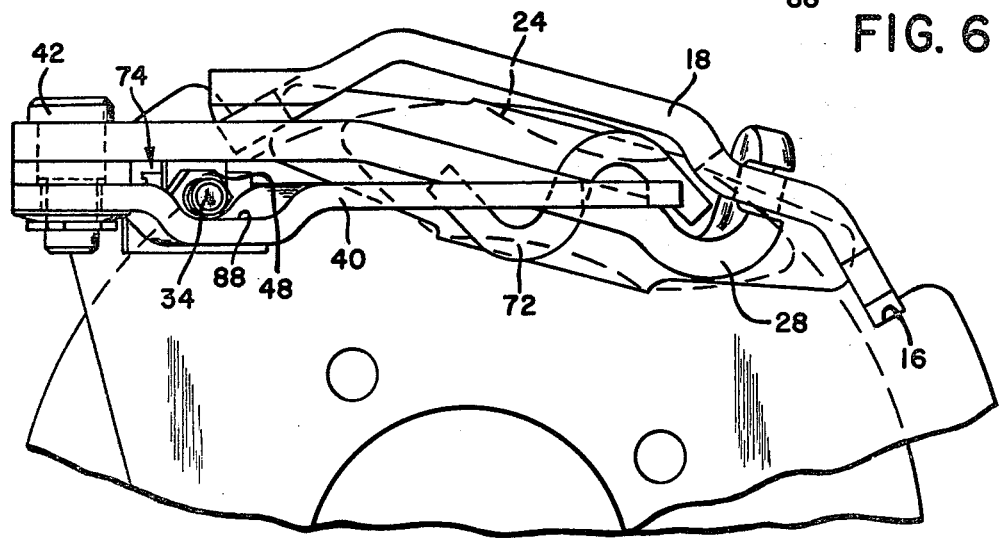
FIG. 4

4,142,611

DISC BRAKE WITH MECHANICAL ACTUATOR

BACKGROUND OF THE INVENTION

A disc brake generally provides a pair of friction elements which are engageable with a rotor to effectuate braking. In a hydraulic system a hydraulic actuator, such as a piston, is responsive to pressurized hydraulic fluid to urge one of the pair of friction elements into engagement with the rotor, resulting in a reaction force which urges the other friction element into engagement with the rotor by means of a frame or caliper member.

In a mechanical disc brake the pair of friction elements are urged into engagement with the rotor by means of an input lever which engages the frame and the one friction element and is movable by an operator to urge the one friction element into engagement with the rotor. The leverage of this input lever requires a long stroke in order to impart sufficient forces to the pair of friction elements to effectively retard the rotation of the rotor. Generally, this input lever is quite long in order to provide a sufficient stroke. Consequently, a mechanical disc brake having a compact arrangement of levers to impart braking forces to the pair of friction elements is believed to be an improvement over the prior art.

SUMMARY OF THE INVENTION

In a mechanical disc brake a frame is slidably supported relative to a rotor such that the frame carries a pair of friction elements opposite friction surfaces on the rotor. A second lever and a link are pivotally engaged with the frame and also coupled with a first lever such that movement of the first lever causes the link and second lever to urge the pair of friction elements into engagement with the rotor.

In particular the second lever is pivotally engaged with the frame and a spacer connects the second lever with one of the pair of friction elements. The second lever extends through a frame opening to pivotally engage the first lever so that actuation of the first lever pivots the second lever relative to the frame to urge the spacer and the one friction element either towards or away from the rotor depending on the direction of actuation of the first lever.

The second lever is pivotally engaged with the frame and connected to the first lever such that actuation of the first lever moves the second lever relative to the link so that the link and the second lever cooperate with the frame to urge the pair of friction elements into engagement with the rotor.

The link carries an adjustment means which maintains the pair of friction elements in close proximity to the rotor so that a minimum stroke of the first lever causes the friction elements to engage the rotor. Moreover, a plate releasably engages the first lever to oppose the adjustment means, thereby connecting the link with the first lever.

The link and second lever are pivotally secured to the frame at substantially diagonal opposite corners of the frame on opposite sides of the rotor. Moreover, in a preferred embodiment the second lever engages a recess on the frame opening to provide for pivoting relative to the frame and the spacer is S-shaped.

BRIEF DESCRIPTION OF THE DRAWINGS

FIG. 3 is a top plan view of a preferred embodiment of the disc brake of FIG. 1;

FIG. 4 is a partial front view of the preferred embodiment of FIG. 3;

FIG. 5 is a view of the encircled portion of the input member of FIG. 3; and

FIG. 6 is a partial cross-sectional view taken along line 6—6 of FIG. 3.

DETAILED DESCRIPTION

Figure 1:
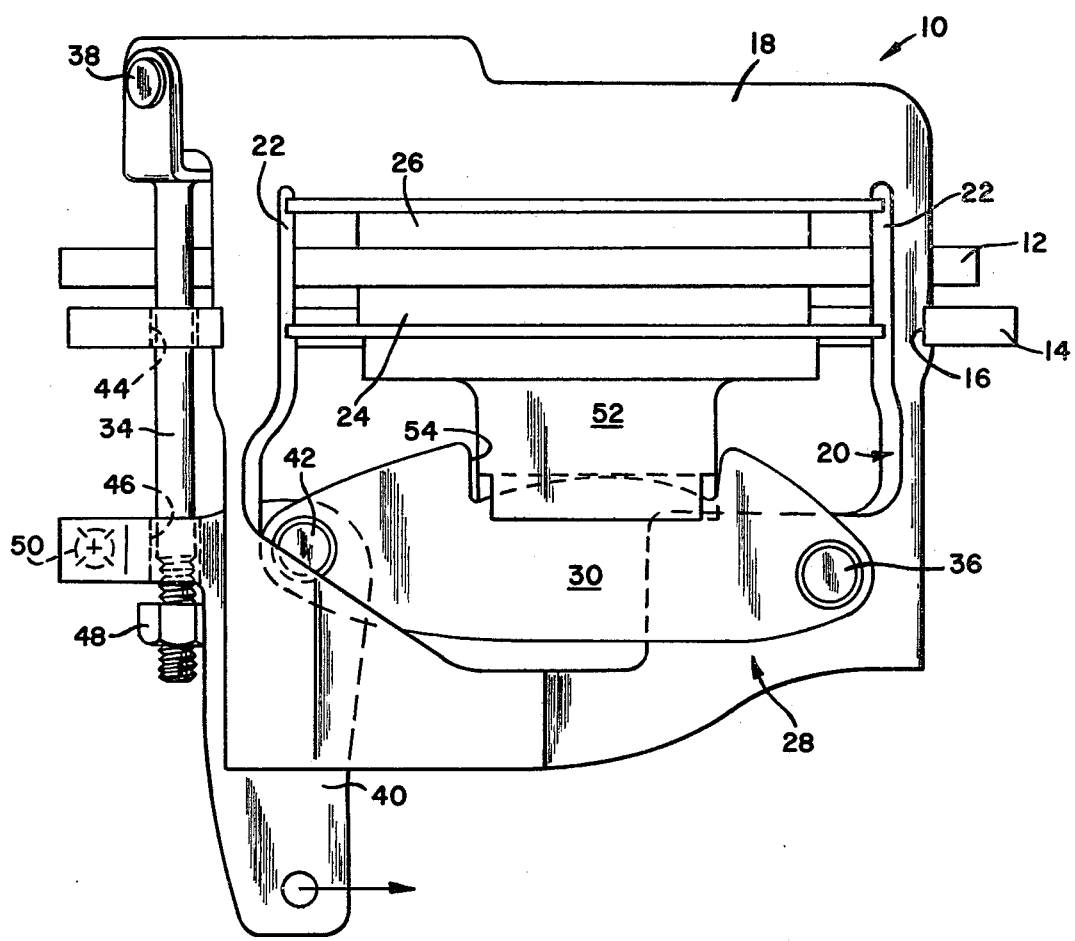
FIG. 1 is a top plan view of a mechanical disc brake constructed according to the present invention.

Turning to the drawings, a mechanical disc brake constructed according to the present invention is illustrated in general at 10. A rotor 12 is mounted for rotation relative to a stationary member (not shown) and a support 14 is fixedly secured to the stationary member. The support 14 is juxtapositioned near one side of the rotor 12 and is provided with recesses at 16 for slidably receiving and carrying a frame 18.

The frame 18 includes a central opening 20 which forms guide 22 for slidably carrying a pair of friction elements 24, 26 which are movable axially along the guides to engage opposite sides of the rotor 12, thereby retarding the rotation of the latter to effectuate braking of the same.

Figure 2:
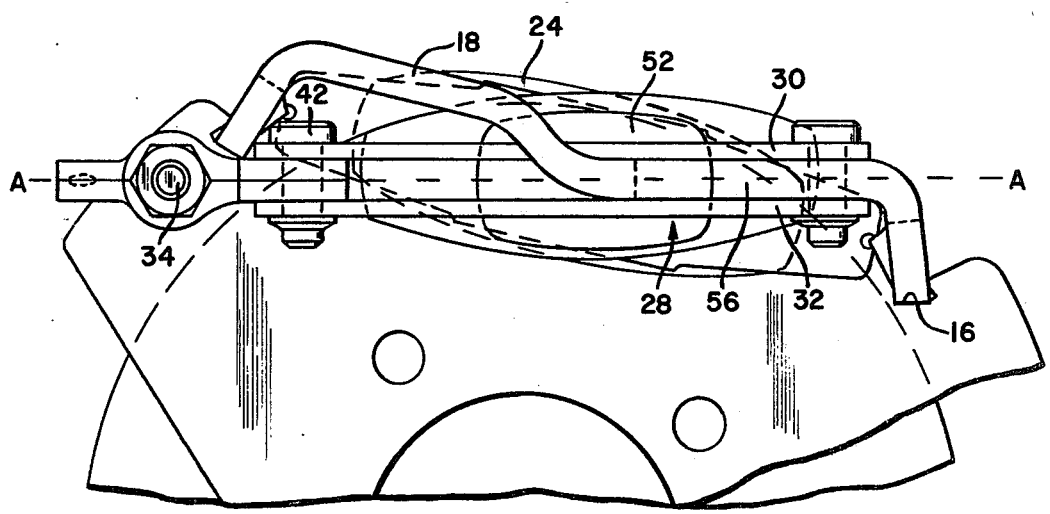
FIG. 2 is a partial front view of the disc brake of FIG. 1.

In the embodiment of FIGS. 1 and 2, the frame 18 pivotally supports a second lever 28 which comprises an upper member 30 and a lower member 32 and a link 34 via respective pins 36 and 38. The pins are disposed at substantially opposite diagonal corners of the frame 18 on opposite sides of the rotor 14. The second lever 28 extends through the frame opening 20 to pivotally engage an input member or first lever 40 via pin 42 and the link 34 extends through an opening 44 on the support 14 to project through an opening 46 on the first lever 40. An adjusting nut 48 threadably engages the link 34 and opposes the first lever 40. As clearly illustrated in FIG. 1, the first lever 40 includes a leg 50 which defines the opening 46.

In order to transmit movement of the second lever 28 to the friction element 24 and distribute braking forces along the friction element 24, a spacer 52 is disposed between the friction element 24 and the second lever 28. A recess 54 on the second lever 28 receives the spacer 52.

MODE OF OPERATION

When the first lever 40 is urged in the direction illustrated in FIG. 1, the second lever 28 is rotated clockwise about pin 36 thereby urging the spacer 52 and the friction element 24 towards the rotor 12. With the friction element 24 engaging the rotor 12, further movement of the first lever 40 in the direction illustrated pivots the latter about pin 42 in a counterclockwise direction thereby moving the link 34 downward, viewing FIG. 1. This movement of the link 34 urges the frame 18 to move downward also so that the frame 18 urges the friction element 26 into engagement with the rotor 12.

It is noted viewing FIG. 1, that the force imparted to the second lever by the first lever, when the second lever is engaged with the rotor, cooperates with the pin 36 to urge the frame 18 downward at the same time that the link 34 also urges the frame 18 downward.

Viewing FIG. 2, it is seen that the upper member 30 extends through the frame opening 20 while the lower member 32 and the upper member 30 extend parallel to a portion of the frame at 56 adjacent the pin 36. Moreover, the axis of the link 34 coincides with the plane of rotation A-A for the second lever 28 and the direction of the applied force, so that the levers, link, and frame are prevented from tilting relative to the support.

DESCRIPTION OF THE PREFERRED EMBODIMENT

In the preferred embodiment of FIGS. 3 and 4 wherein like reference numerals refer to similar parts, the second lever 28 includes a first recess at 58 which mates with a recess at 60 on the opening 20 to pivotally connect the second lever 28 with the frame 18. A second recess on the second lever at 62 mates with a recess at 64 on an S-shaped spacer 72 which imparts movement to the friction element 24.

The input member or first lever 40 and the second lever 28 are pivotally connected by means of a pin 42 and the link 34 carries an adjusting nut 48 which opposes a plate 74 secured to the first lever 40. Consequently, movement of the first lever via the force illustrated in FIG. 3 causes the first lever 40 to pivot clockwise relative to the plate 74, thereby pivoting the second lever clockwise about recess 60 to urge the S-shaped spacer and friction element 24 toward the rotor 12. With the friction element 24 engaging the rotor 12, the first lever 40 pivots clockwise about the pin 42. Consequently, further movement of the first lever in the direction illustrated after the friction element 24 engages the rotor, pivots the first lever 40 about the pin 42 thereby moving the link 34 and the frame 18 downward to urge the friction element 26 towards the rotor 12. At the same time, the resistance of the friction element 24 abutting the rotor 12 causes the second lever 28 to pivot clockwise about the recess 64 thereby also urging the frame 18 to move downward.

Turning to FIGS. 5 and 6 it is seen that the first lever 40 includes an opening 76 with an enlarged portion at 78 and a reduced portion at 80. The plate 74 is L-shaped with a top arm at 82 and a side arm at 84. The side arm 84 includes an opening 86 for receiving the link 34 which is disposed within a groove 88 on the first lever 40 and the top arm 82 rests on the link 34. The side arm 84 is inserted in the enlarged portion 78 and moved axially toward the rotor 12 until the side arm 84 is disposed within the reduced portion 80. In this position the plate 74 receives the link 34 through the opening 86 so that the nut 48 opposes the side arm 84, thereby releasably interlocking the link 34 to the first lever 40.

Because the second lever and the link are pivotally connected at substantially opposite diagonal corners on the frame, the braking forces transmitted by the friction elements to the rotor are generally maintained in axial alignment with the input force transmitted to the first lever, as illustrated. Consequently, pivoting of the frame is minimal during a braking application.

Although many variations of the present invention will be apparent to those skilled in the art, it is intended that all such variations will be covered within the scope of the appended claims.

I claim:

1. In a disc brake having a rotor, a support disposed adjacent one side of the rotor, a frame slidably carried by the support and extending over a portion of the outer periphery of the rotor, and the frame defining a central opening for carrying a pair of friction elements which are engageable with the rotor, the improvement wherein a lever pivotally connects with the frame on one side of the rotor and a link pivotally connects with the frame diagonally on the other side of the rotor, an input member coupled directly only to said lever and said link such that said input member pivots independently of the frame and cooperates with said lever and said link to urge the pair of friction elements into engagement with the rotor, said lever extending from the pivotal connection with the frame through the central opening in order to couple with said input member.

* * * * *